(12) United States Patent  (10) Patent No.: US 8,896,884 B2
Yamada et al.  (45) Date of Patent: Nov. 25, 2014

(54) IMAGE PROCESSING APPARATUS, PRINTING APPARATUS, AND IMAGE PROCESSING METHOD

(71) Applicant: Canon Kabushiki Kaisha, Tokyo (JP)

(72) Inventors: Akitoshi Yamada, Yokohama (JP); Tomokazu Ishikawa, Yokohama (JP); Senichi Saito, Funabashi (JP); Fumitaka Goto, Tokyo (JP); Nobutaka Miyake, Yokohama (JP); Mitsuhiro Ono, Tokyo (JP); Ryosuke Iguchi, Kawasaki (JP); Hidetsugu Kagawa, Kawasaki (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/076,608

(22) Filed: Nov. 11, 2013

(65) Prior Publication Data

US 2014/0139852 A1 May 22, 2014

(30) Foreign Application Priority Data

Nov. 16, 2012 (JP) .................................. 2012-252262

(51) Int. Cl.
*H04N 1/405* (2006.01)
*G06K 15/02* (2006.01)

(52) U.S. Cl.
CPC ...................................... *G06K 15/02* (2013.01)
USPC ........................................ 358/3.14; 358/3.16

(58) Field of Classification Search
USPC ............ 358/3.13–3.2, 1.8; 347/12–15, 43, 45
See application file for complete search history.

(56) References Cited

U.S. PATENT DOCUMENTS

| | | | |
|---|---|---|---|
| 6,025,929 A | 2/2000 | Nakajima et al. | |
| 6,046,819 A * | 4/2000 | Yoshida | 358/1.8 |
| 6,135,656 A * | 10/2000 | Kato et al. | 400/120.15 |
| 6,409,299 B1 * | 6/2002 | Aihara | 347/15 |
| 7,370,929 B2 | 5/2008 | Kitagawa | |
| 2011/0285780 A1 | 11/2011 | Yamada et al. | |
| 2011/0286020 A1 | 11/2011 | Ishikawa et al. | |
| 2012/0081768 A1 * | 4/2012 | Iguchi et al. | 358/518 |

FOREIGN PATENT DOCUMENTS

JP 10-13674 A 1/1998
JP 2007-196472 A 8/2007

* cited by examiner

*Primary Examiner* — Barbara Reinier
(74) *Attorney, Agent, or Firm* — Fitzpatrick, Cella, Harper & Scinto

(57) ABSTRACT

As viewed for each processing unit in head shading (HS) processing, a processing unit width is more than one pixel, so that a threshold arrangement corresponding to a target quality of an image intended by a dither matrix is kept while a possibility of avoiding zero dots from being generated can be enhanced. Moreover, the threshold arrangement is kept while a possibility of generating the same number of dots in processing units can be enhanced. Consequently, the threshold arrangement corresponding to a predetermined target quality of an image intended by a dither matrix is kept while it is possible to reduce occurrence of uneven density caused by the HS processing. Thus, it is possible to prevent the threshold arrangement from being limited by the HS processing according to the degree of the reduction.

6 Claims, 11 Drawing Sheets

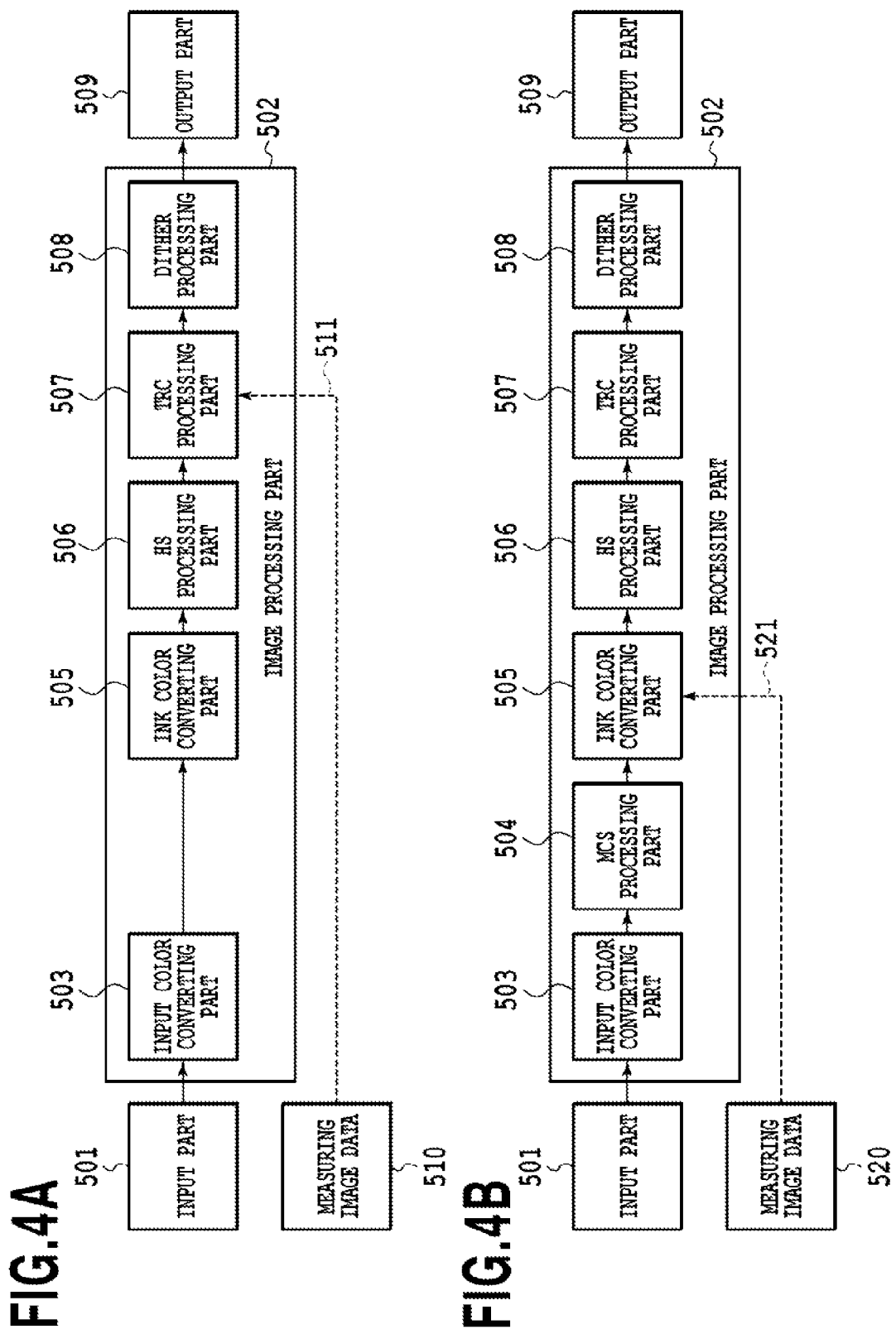

IMAGE PROCESSING APPARATUS, PRINTING APPARATUS, AND IMAGE PROCESSING METHOD

BACKGROUND OF THE INVENTION

1. Field of the Invention

The present invention relates to an image processing apparatus, a printing apparatus, and an image processing method. More particularly, the present invention relates to correction for suppressing an uneven density caused by variations of print characteristics of printing elements, the correction being performed in an image processing system for performing quantization with a dither matrix.

2. Description of the Related Art

The head shading (abbreviated as "HS") technique disclosed in Japanese Patent Application Laid-open No. Hei 10-13674 (1998) has been known as one example of the correction for suppressing an uneven density of the aforementioned type. This HS technique is adapted to perform correcting based on information on ink ejection characteristics (i.e., print characteristics) of each of nozzles serving as printing elements. For example, in response to information that amount of ink to be ejected by a certain nozzle is more than normal amount, image data is corrected so as to decrease a gradation value indicated by the image data corresponding to the nozzle. In contrast, in response to information that amount of ink to be ejected by a certain nozzle is less than the normal amount, image data is corrected so as to increase a gradation value indicated by the image data corresponding to the nozzle. In this manner, the number of ink dots to be eventually printed is increased or decreased, so that the density of a print image formed based on the image data can become substantially even in each of the nozzles.

When a patch is printed in order to create a correction parameter used for the HS or the like, the relationship between the number of pixels that is a unit for the correction and the arrangement of thresholds on the dither matrix may be often improper in the case of the use of a dither matrix for quantization for generating print data for the patch. More specifically, the number of pieces of data indicating printing a dot ("1" signifies printing; hereinafter it may be simply referred to as a "dot"), which is generated in a processing unit corresponding to a certain printing element, and the number of dots generated in a processing unit corresponding to another printing element, with respect to image data having the same gradation value may be remarkably different from the arrangement of the thresholds on the dither matrix. As a consequence, the density measured of a printed patch is different according to the printing elements in the processing unit, and therefore, the print characteristics of each of the printing elements in the processing unit cannot be accurately reflected. That is to say, even if the print characteristics of all of the printing elements are the same as each other, the measurement result of the patch printed based on quantization data with the dither matrix shows that the print characteristics of the printing elements are different according to the processing units. And thus, an uneven density occurs on a print image in accordance with the image data corrected with a correction parameter formed based on the measurement result.

In order to avoid the above-described problem that the number of dots to be formed is different in each of the processing units for the correction, it is conceived to form a dither matrix having the arrangement of thresholds in such a manner as to achieve the same number of dots in every processing unit. However, the condition of the formation of such a dither matrix restricts the arrangement of thresholds capable of achieving a target quality of an image, such as reduction of granularity, which is inherent to a dither matrix of a spiral type or Bayer type.

SUMMARY OF THE INVENTION

An object of the present invention is to relatively reduce the limitation to threshold arrangement on a dither matrix for achieving a given target quality of an image in the case of quantization with the dither matrix in a system for performing correction such as HS. Specifically, an object of the present invention is to provide an image processing apparatus, a printing apparatus, and an image processing method, in which the characteristics of the threshold arrangement on the dither matrix for achieving the target quality of an image can be maintained, and further, the number of dots obtained by the quantization with the dither matrix is determined in such a manner as not to be largely varied according to the processing unit.

In a first aspect of the present invention, there is provided an image processing apparatus that generates print data for performing printing by using a printing element array in which a plurality of printing elements are arrayed, the apparatus comprising: a correction unit configured to correct an image data of a pixel that corresponds to a printing element of a printing element group, according to print characteristics of the printing element of the printing element group, the correcting the image data being performed for each of processing units that respectively correspond to a plurality of the print element groups, which are obtained by dividing the plurality of printing elements of the printing element array; and a quantizing unit configured to quantize the image data that has been corrected by the correction unit, by using a dither matrix, wherein a number of pixels of the dither matrix on which thresholds are set, in an array direction in which the printing elements are arrayed, and a number of pixels of the processing unit in the array direction, which correspond to the pixels of the print element group, are not coprime to each other and are two or more respectively.

In a second aspect of the present invention, there is provided a printing apparatus that performs printing based on print data by using a printing element array in which a plurality of printing elements are arrayed, the apparatus comprising: a correction unit configured to correct an image data of a pixel that corresponds to a printing element of a printing element group, according to print characteristics of the printing element of the printing element group, the correcting the image data being performed for each of processing units that respectively correspond to a plurality of the print element groups, which are obtained by dividing the plurality of printing elements of the printing element array; and a quantizing unit configured to quantize the image data that has been corrected by the correction unit, by using a dither matrix, wherein a number of pixels of the dither matrix on which thresholds are set, in an array direction in which the printing elements are arrayed, and a number of pixels of the processing unit in the array direction, which correspond to the pixels of the print element group, are not coprime to each other and are two or more respectively.

In a third aspect of the present invention, there is provided an image processing method for generating print data used for performing printing by using a printing element array in which a plurality of printing elements are arrayed, the method comprising: a correction step of correcting an image data of a pixel that corresponds to a printing element of a printing element group, according to print characteristics of the printing element of the printing element group, the correcting the image data being performed for each of processing units that respectively correspond to a plurality of the print element groups, which are obtained by dividing the plurality of printing elements of the printing element array; and a quantizing step of quantizing the image data that has been corrected in the correction step, by using a dither matrix, wherein a number of pixels of the dither matrix on which thresholds are set, in an array direction in which the printing elements are arrayed, and a number of pixels of the processing unit in the array direction, which correspond to the pixels of the print element group, are not coprime to each other and are two or more respectively.

With the above-described configuration, the number of pixels indicating the size of the dither matrix and the number of pixels as the processing unit are determined as not being coprime to each other and being two or more. In this manner, it is possible to maintain the characteristics of the threshold arrangement on the dither matrix for achieving the target quality of an image, and further, to prevent the number of dots obtained by the quantization with the dither matrix from being largely varied according to the processing unit. Consequently, it is possible to relatively reduce the limitation to the threshold arrangement on the dither matrix for achieving the given target quality of an image.

Further features of the present invention will become apparent from the following description of exemplary embodiments with reference to the attached drawings.

BRIEF DESCRIPTION OF THE DRAWINGS

FIG. 4A is a block diagram illustrating the feature of image processing to be performed by the ink jet printer according to a first embodiment of the present invention;

FIG. 4B is a block diagram illustrating the feature of image processing according to a second embodiment of the present invention;

DESCRIPTION OF THE EMBODIMENTS

Hereinafter, embodiments of the present invention will be explained in detail with reference to the attached drawings.

Figure 1:
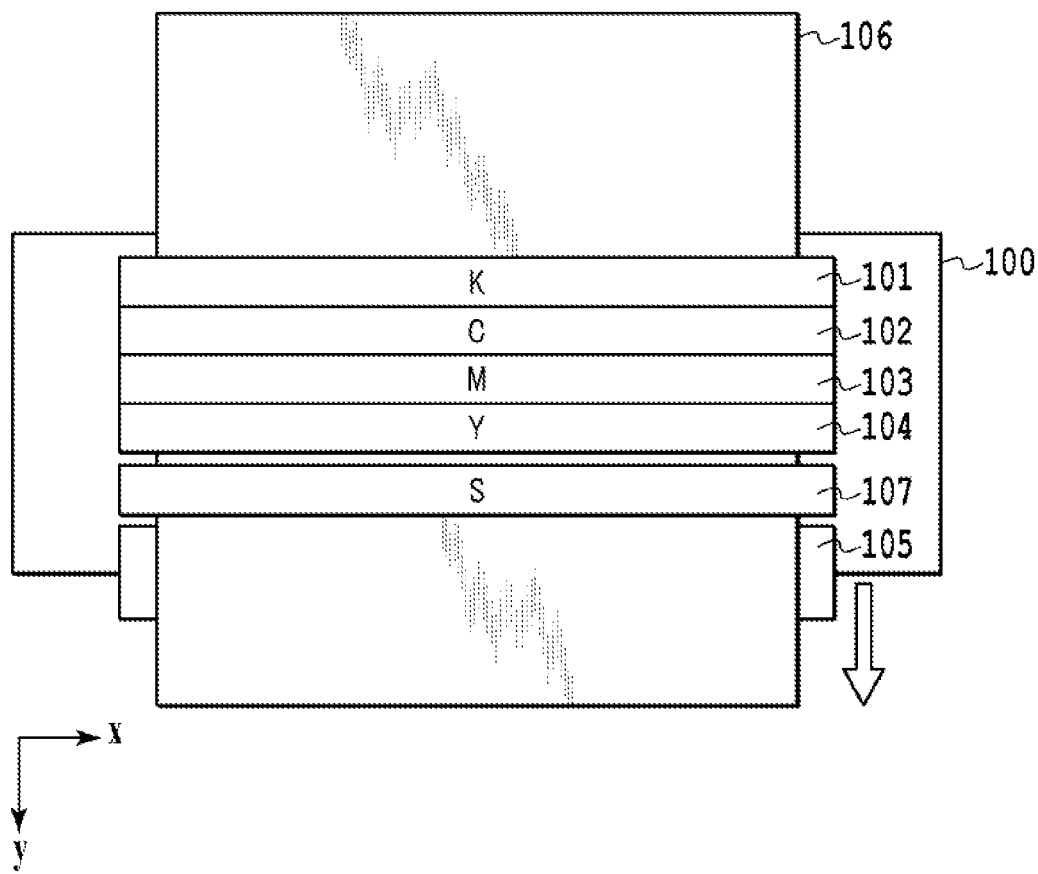
FIG. 1 is a view schematically showing an ink jet printer exemplifying an ink jet printing apparatus of the present invention.

FIG. 1 is a view schematically showing an ink jet printer exemplifying an ink jet printing apparatus of the present invention. The printer in the present embodiment is a printing apparatus of a full line type, and it is provided with print heads 101 to 104, as shown in FIG. 1. Each of the print heads 101 to 104 includes nozzle arrays (i.e., printing element arrays), which correspond to the width of a print medium 106 and has a plurality of nozzles serving as printing elements for ejecting the same kind of ink, the nozzles being arrayed in an x direction, as described later with reference to FIG. 2. The print heads 101 to 104 eject black (K), cyan (C), magenta (M), and yellow (Y) inks, respectively. The print heads 101 to 104 for ejecting the plurality of kinds of inks are arranged in a y direction that is a conveyance direction of the print medium.

Figure 2:
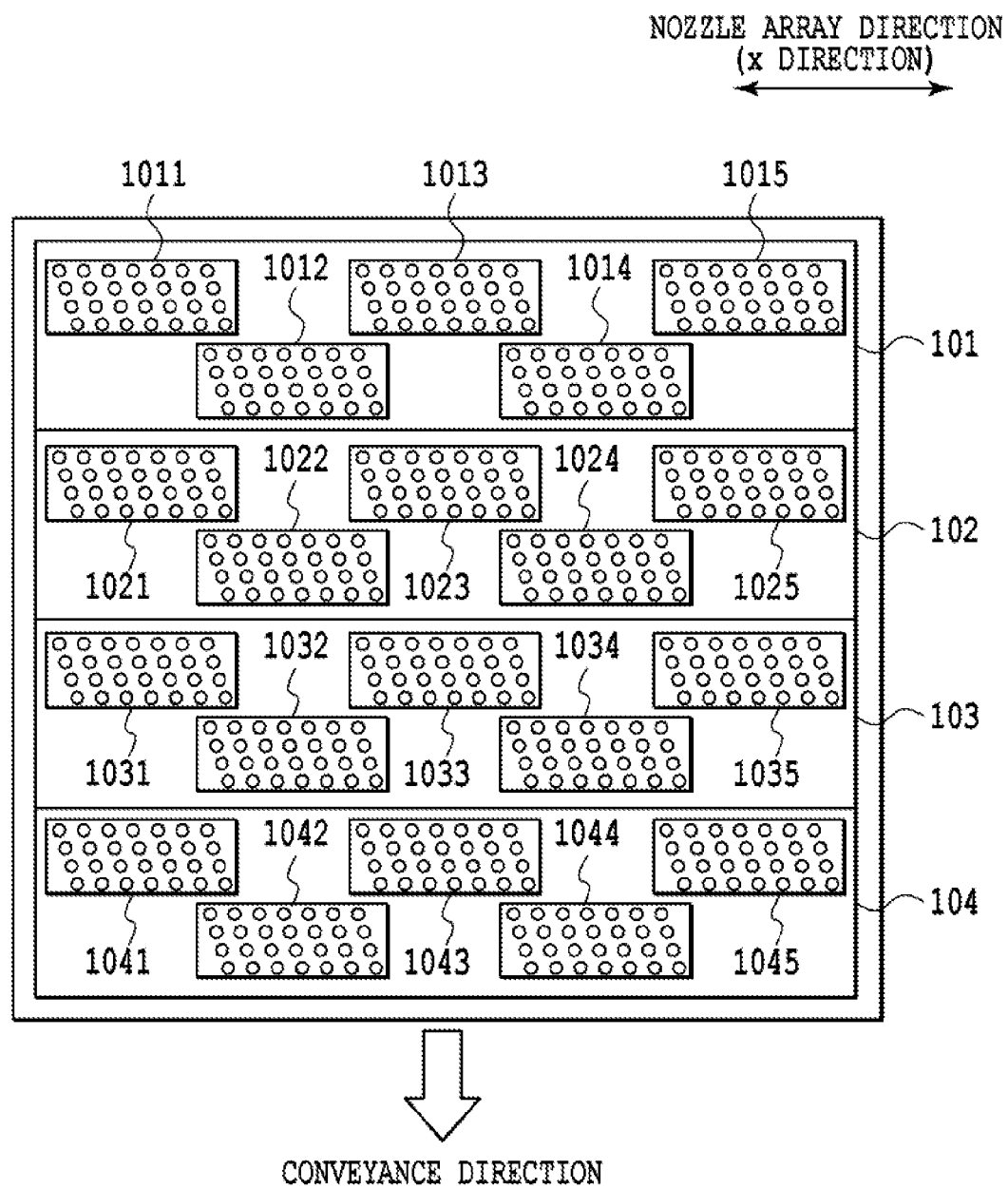
FIG. 2 is a diagram illustrating the details of a nozzle array in each of print heads 101 to 104.

FIG. 2 is a diagram illustrating the details of nozzle arrays in each of the print heads 101 to 104. As illustrated in FIG. 2, a plurality of ejection boards (1011 to 1015, 1021 to 1025, 1031 to 1035, and 1041 to 1045) are arranged at the print heads 101 to 104, respectively. Each of the ejection boards is provided with nozzles, a heater for generating thermal energy for the purpose of ejection, an ink passage, and the like. In each of the print heads 101 to 104, one of the ejection boards has four nozzle arrays consisting of a plurality of nozzles arrayed at 300 dpi in the x direction in FIG. 2 in four rows at a distance equivalent to 1200 dpi separated from each other. Moreover, the four ejection boards are arranged in the x direction such that the nozzle arrays partly overlap. In this manner, the nozzle arrays, each consisting of the plurality of nozzles arrayed in a density of 1200 dpi as a whole in the x direction, are configured in each of the print heads. For the sake of simplification of the illustration, the nozzle array obtained by combining the nozzles in the four rows is represented by the nozzles in a single row in a density of 1200 dpi in FIGS. 5A to 5C, 7A, and 7B, described later.

Referring to FIG. 1 again, the print medium 106 is conveyed in the y direction crossing the x direction in FIG. 1 when a conveyance roller 105 (and other rollers, not shown) is rotated by the driving force of a motor, not shown. During the conveyance of the print medium 106, ink is ejected from the plurality of nozzles in each of the print heads 101 to 104 based on print data at a frequency corresponding to the conveyance speed of the print medium 106. Consequently, dots of each color are formed at a predetermined resolution based on the print data, and then, an image is printed on the print medium 106.

Figure 6A:
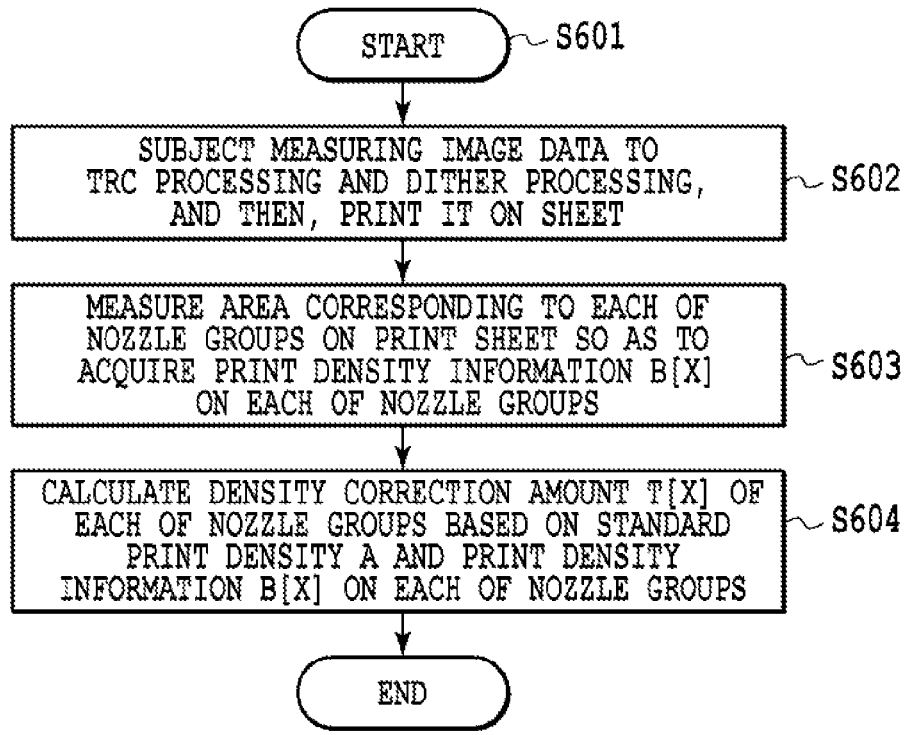
FIGS. 6A and 6B are flowcharts explanatory of processing for generating parameters of a table to be used in an HS processing part 506 illustrated in FIG. 4A and image processing with parameters generated during an actual printing operation according to the first embodiment of the present invention, respectively.

A scanner 107 is provided downstream, in the conveyance direction, of the print heads 101 to 104 arranged in the y direction. The scanner 107 has reading elements arranged at a predetermined pitch in the x direction, and thus, is used for reading an image, for example, reading the density of a patch printed on the print medium when a correction parameter for HS (abbreviating "head shading"), described later with reference to FIG. 6A, is generated. And then, the scanner 107 outputs RGB data as a reading result.

Incidentally, a printing apparatus, to which the present invention is applicable, is not limited to the above-described full-line type apparatus. For example, the present invention is applicable also to a so-called serial type printing apparatus in which print heads are configured in such a manner as to scan a print medium in a direction crossing a conveyance direction of a print medium so as to print the image. Moreover, although the print heads are provided in a manner corresponding to the ink colors in the present embodiment, a single print head may eject a plurality of color inks. Furthermore, nozzle arrays corresponding to a plurality of color inks may be arrayed on a single ejection board.

Figure 3:
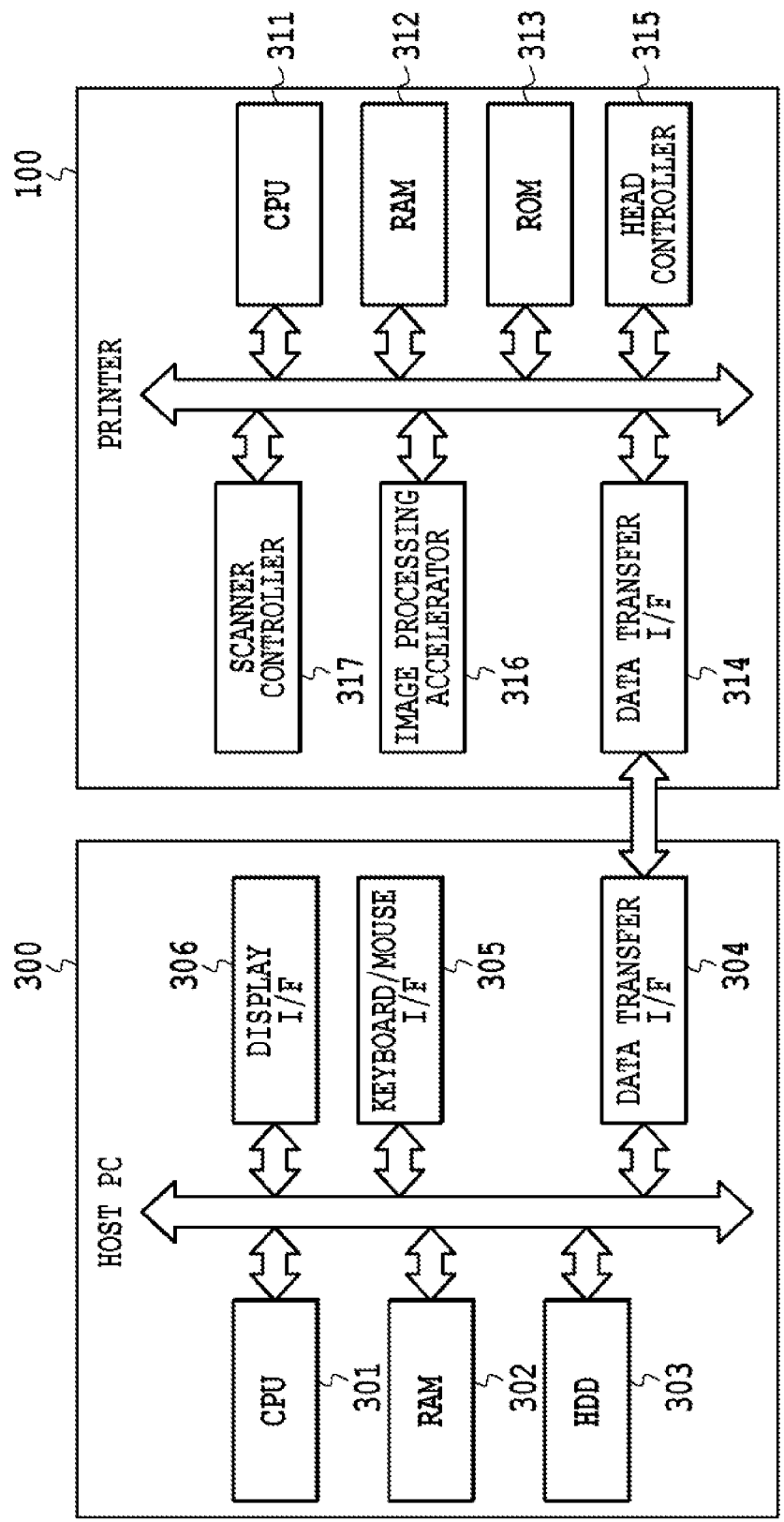
FIG. 3 is a block diagram illustrating a printing system including the printer shown in FIG. 1 and a personal computer (abbreviated as a "PC") 300 serving as a host apparatus.

FIG. 3 is a block diagram illustrating a printing system including the printer shown in FIG. 1 and a personal computer (abbreviated as a "PC") 300 serving as a host apparatus.

The host PC 300 principally includes the following constituent elements. A CPU 301 performs processing in accordance with a program stored in an HDD 303 or a RAM 302 serving as a storing part. The RAM 302 is a volatile storing part, for temporarily storing a program or data therein. In the meantime, the HDD 303 is a non-volatile storing part, for storing a program or data therein in the same manner. A data transfer I/F (abbreviating an "interface") 304 is adapted to control the transmission or reception of data to or from a printer 100. This data transmission or reception connecting system is achieved by using a USB, IEEE1394, a LAN, or the like. A keyboard/mouse I/F 305 is designed to control an HID (abbreviating a "human interface device") such as a keyboard or a mouse. A user can input data via the I/F 305. A display I/F 306 controls displaying by a display, not shown.

In the meantime, the printer 100 principally includes the following constituent elements. A CPU 311 performs processing in an embodiment regarding the HS, described later, in accordance with a program stored in a ROM 313 or a RAM 312. The RAM 312 is a volatile storing part, for temporarily storing a program or data therein. The ROM 313 is a non-volatile storing part capable of storing therein table data or a program to be used in the HS, described later.

A data transfer I/F 314 controls the transmission or reception of data to or from the PC 300. A head controller 315 supplies print data to each of the print heads 101 to 104 shown in FIG. 1, and controls an ejecting operation by the print heads. Specifically, the head controller 315 reads a control parameter and print data stored at a predetermined address of the RAM 312. When the CPU 311 writes the control parameter and the print data at the predetermined address of the RAM 312, the head controller 315 starts processing so as to eject ink from the print head. A scanner controller 317 controls each of the reading elements in the scanner 107 shown in FIG. 1, and then, outputs the RGB data obtained by the reading elements to the CPU 311.

An image processing accelerator 316 is hardware capable of performing image processing at a speed higher than that of the CPU 311. Specifically, the image processing accelerator 316 reads a parameter and data required for the image processing from a predetermined address of the RAM 312. When the CPU 311 writes the parameter and data at the predetermined address of the RAM 312, the image processing accelerator 316 is started up to cause the data to be subjected to predetermined image processing. In the present embodiment, software executed by the CPU 311 performs processing of creating parameters of a correction table to be used in an HS processing part, described later. In the meantime, the hardware of the image processing accelerator 316 performs image processing at the time of printing including the processing by the HS processing part. Here, the image processing accelerator 316 is not an essential constituent element. Therefore, it is to be understood that only the CPU 311 may perform the table parameter creation and the image processing according to the specifications of a printer.

FIG. 4A is a block diagram illustrating the structure of image processing to be performed by an ink jet printer according to a first embodiment of the present invention. That is to say, an image processing part of the present embodiment is made up of the elements required for controlling and processing in the printer 100 illustrated in FIG. 3. Here, it should be construed that the present invention is applicable to not only this configuration but also other configurations. For example, the image processing part may be made up of the elements in the PC 300 illustrated in FIG. 3. Alternatively, a part of the image processing may be made up of elements of the PC 300 whereas the other parts of the image processing part may be made up of the elements of the printer 100. Such image processing parts will be referred to as an image processing apparatus in the present specification.

As shown in FIG. 4A, an input part 501 outputs image data received from the host PC 300 to an image processing part 502. The image processing part 502 is constituted by including an input color converting part 503, an ink color converting part 505, an HS processing part 506, a TRC (abbreviating "tone reproduction curve") processing part 507, and a dither processing part 508.

In the image processing part 502, first, the input color converting part 503 converts the input image data received from the input part 501 into image data according to a color reproduction area by the printer. In the present embodiment, the input image data represents color coordinates (R, G, B) in color space coordinates based on the sRGB that indicates colors represented on a monitor. The input color converting part 503 converts the R, G, and B input image data, each having 8 bits, into image data (R', G', B') corresponding to the color reproduction area by the printer by a known technique such as matrix operation or processing using a three-dimensional look-up table (abbreviated as a "3DLUT"). In the present embodiment, interpolation is performed simultaneously with the processing using the 3DLUT, thus achieving the conversion. Here, the resolution of the 8-bit image data to be processed in the image processing part 502 in the present embodiment is 1200 dpi, and further, the resolution of binary data obtained by quantization in the dither processing part 508 also is 1200 dpi.

The ink color converting part 505 converts the R, G, and B image data, each having 8 bits, processed by the input color converting part 503 into image data that is color signal data on ink to be used in the printer. Since the printer 100 in the present embodiment uses black (K), cyan (C), magenta (M), and yellow (Y) inks, the image data on an RGB signal is converted into image data consisting of 8-bit color signals representing K, C, M, and Y inks. This color conversion also is achieved by simultaneously using an interpolating operation with the 3DLUT in the same manner as the above-described processing by the input color converting part 503. Here, the technique of a matrix operation or the like may be used as another converting technique in the same manner as described above.

The HS processing part 506 receives the image data on the ink color signal and subjects the 8-bit data per ink color to correction according to the ejection characteristics of each of the nozzles constituting the print head. The number of pixels indicating a processing unit in the HS processing part 506 is an integral multiple of the size of a dither matrix (i.e., the number of pixels) to be used in the dither processing part 508, as described later with reference to FIG. 6A and the like.

The TRC processing part 507 subjects the image data consisting of the 8-bit ink color signals that have been subjected to the HS processing to correction for adjusting the number of dots to be printed by an output part 509 per ink color. In general, no linear relationship is built between the number of dots to be printed on a print medium and an optical density achieved by the print medium with the number of dots. Consequently, the TRC processing part 507 adjusts the number of dots to be printed on a print medium by correcting the 8-bit image data, so as to build the linear relationship.

The dither processing part 508 quantizes the 256-value and 8-bit image data on the ink color, the image data having been processed in the TRC processing part 507, thereby generating binary data of 1 bit, in which "1" indicates printing whereas "0" indicates non-printing. Incidentally, the present invention is not limited to a configuration in which the 8-bit image data is converted directly into binary data (i.e., dot data). For example, the 8-bit image data may be once quantized to multi-valued data consisting of several bits, and in the end, may be converted into binary data with a dot arrangement pattern.

The output part 509 drives the print head to eject each color ink onto the print medium for performing printing based on the binary data (i.e., the dot data) obtained by the quantization. In the present embodiment, the output part 509 includes a print mechanism provided with the print heads 101 to 104 shown in FIG. 1.

First Embodiment

A description will be given below of a first embodiment regarding the relationship between the number of pixels as the processing unit used for the HS processing and the number of pixels corresponding to the size of a dither matrix in the printing system according to the above-described embodiment of the present invention. First of all, before explanation on the first embodiment, explanation will be made on the case where the HS processing in which a mismatch is caused between a pixel width as the processing unit for the HS processing and the size of a dither matrix causes an uneven density in printing.

Figure 5A:
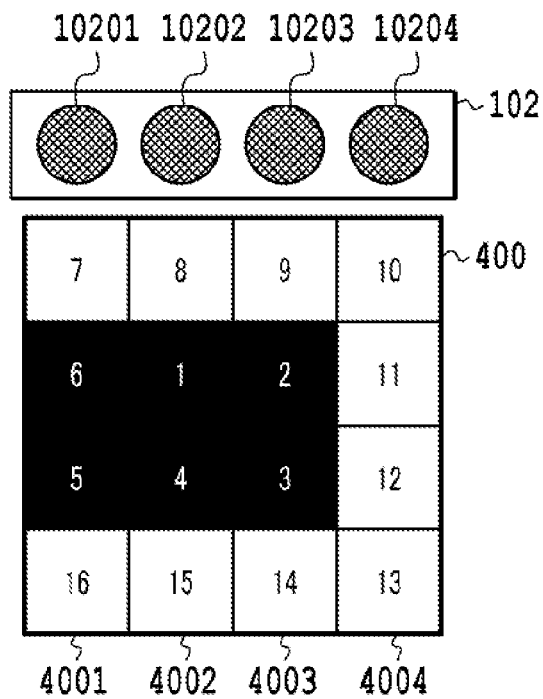
FIGS. 5A to 5C are diagrams explanatory of the case where an uneven density is caused by HS.
Figure 5B:
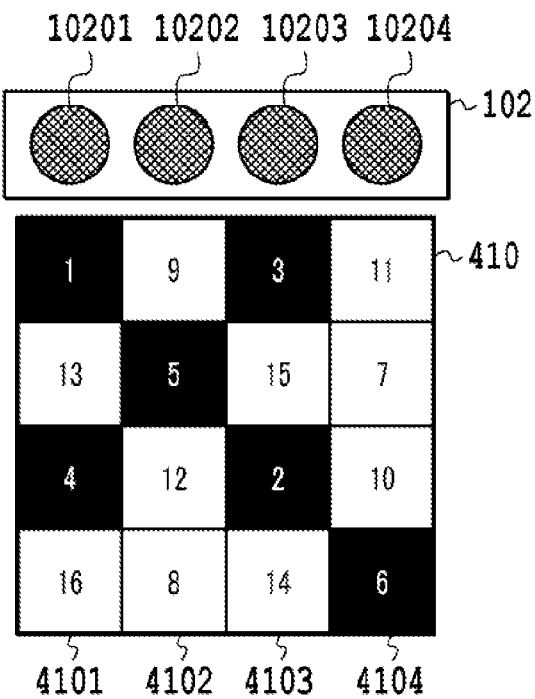
Figure 5C:
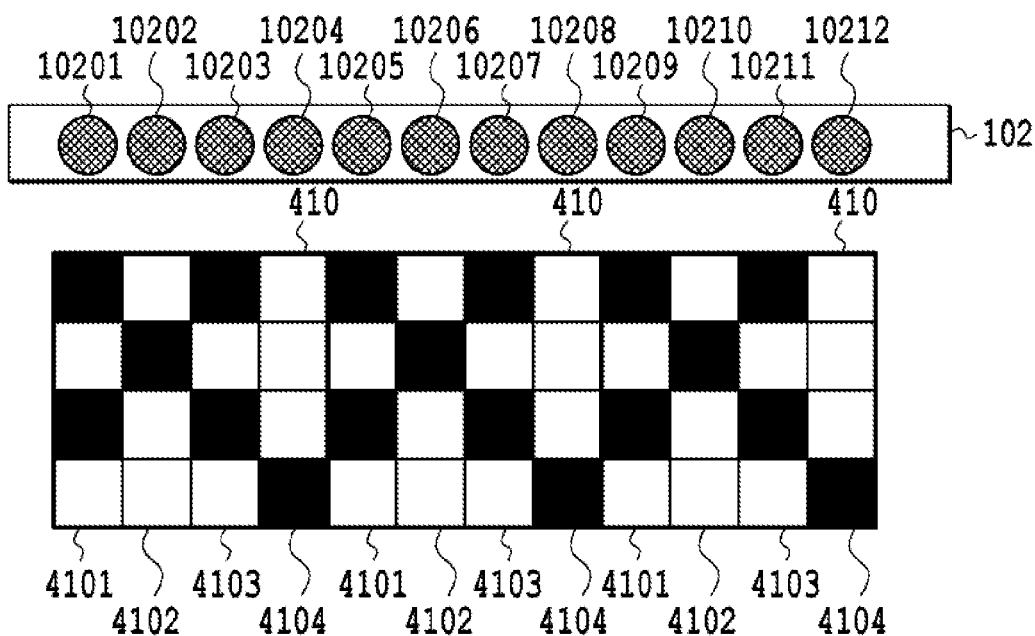

FIGS. 5A to 5C are diagrams explanatory of the case where an uneven density is caused by the HS processing. Here, a description will be given of the case where the print medium is divided into areas for one nozzle in the x direction (i.e., in a lateral direction in FIGS. 5A to 5C) that is the nozzle array direction, and then, a difference in density is caused on images printed in these areas. More specifically, explanation will be made on the case where a processing unit in the HS processing is one pixel corresponding to one nozzle in examples shown in FIGS. 5A to 5C, and density unevenness may be caused by the HS processing.

Referring to FIG. 5A, reference numeral 102 designates the print head for ejecting cyan ink. FIG. 5A illustrates nozzles in the print head, that is, only four nozzles out of a plurality of nozzles arrayed in a nozzle array for ejecting the cyan ink for the sake of simplification of explanation and illustration. Moreover, in order to explain a color difference caused when, for example, a cyan color as a primary color is printed with the cyan ink, only the cyan print head is illustrated. Additionally, FIG. 5A illustrates that all of four nozzles 10201 to 10204 of the print head 102 for ejecting the cyan ink can eject the ink in normal amount in a normal direction, and therefore, dots of the same size are printed on the print medium at a predetermined interval.

Furthermore, in FIG. 5A, reference numeral 400 denotes a dither matrix whose size is 4 pixels multiplied by 4 pixels for the sake of simplification of illustration. A threshold (threshold value) is assigned to each of the pixels on the dither matrix 400. Quantization with the dither matrix compares a value of each of the pixels of the input image data with a threshold of a corresponding pixel, and then, gives 1 (i.e., printing a dot) as a quantization result if the value of the pixel is equal to or greater than the threshold whereas gives 0 (i.e., not printing a dot) as the quantization result if the value of the pixel is lower than the threshold. In the example illustrated in FIG. 5A, the thresholds 1 to 16 are assigned to the pixels in a so-called spiral threshold arrangement pattern. The input image data can take gradations of 0 to 16, that is, 17 gradations.

In the dither matrix 400, four thresholds (i.e., 7, 6, 5, and 16) in a threshold group 4001 correspond to an area that is printed by the nozzle 10201. In the same manner, four thresholds (i.e., 8, 1, 4, and 15) in a threshold group 4002 correspond to an area that is printed by the nozzle 10202;

four thresholds (i.e., 9, 2, 3, and 14) in a threshold group 4003 correspond to an area that is printed by the nozzle 10203; and four thresholds (i.e., 10, 11, 12, and 13) in a threshold group 4004 correspond to an area that is printed by the nozzle 10204. The above-described threshold group corresponds to one pixel as the processing unit in the HS processing.

FIG. 5A illustrates the result of the quantization of the data, in which all of the pixels have the same pixel value (i.e., a gradation value) of the input image data, that is, "6." Specifically, dark pixels in the dither matrix 400 have 1 as a quantization result whereas white pixels have 0 as a quantization result. As is obvious from FIG. 5A, even in the case where all of the nozzles 10201 to 10204 can eject the ink in the normal amount in the normal direction, and further, all of the pixel values of the input image data are the same as each other, the number of dots to be printed on a sheet by each of the nozzles depends upon the nozzles. More specifically, two dots are printed in the area to be printed by each of the nozzles 10201, 10202, and 10203 whereas zero dots are printed in the area to be printed by the nozzle 10204. In a patch printed based on the quantized binary data, in every processing unit of one pixel, the density of two dots is measured in a pixel area for a certain processing unit whereas the density of zero dots is measured in a pixel area for another processing unit. As a consequence, the density according to the pixel value, for example, "6" is measured for the certain processing unit whereas a density lower than the above-described density is measured for the other processing unit. Consequently, a correction parameter for the processing unit measured as the lower density is set in such a manner as to increase the density so as not to accurately reflect its ejection characteristics. At the time of actual printing, the HS processing is performed with the correction parameter, thereby causing density unevenness on the print image.

FIG. 5B illustrates an example in which a dither matrix having a so-called Bayer type threshold arrangement pattern is used, unlike the example illustrated in FIG. 5A.

In the dither matrix 410, four thresholds (i.e., 1, 13, 4, and 16) in a threshold group 4101 correspond to an area that is printed by the nozzle 10201. In the same manner, four thresholds (i.e., 9, 5, 12, and 8) in a threshold group 4102 correspond to an area that is printed by the nozzle 10202;

four thresholds (i.e., 3, 15, 2, and 14) in a threshold group 4103 correspond to an area that is printed by the nozzle 10203; and four thresholds (i.e., 11, 7, 10, and 6) in a threshold group 4104 correspond to an area that is printed by the nozzle 10204.

Also in this case, all of the nozzles 10201 to 10204 can eject ink in normal amount in a normal direction. Even in the case where the pixel values of input image data are the same as each other, the numbers of dots to be printed on a sheet by the nozzles are different from each other. Specifically, there are two dots in an area to be printed by each of the nozzles 10201 and 10203 whereas there is one dot in an area to be printed by each of the nozzles 10202 and 10204. As a consequence, similarly in this case, the correction parameter for the HS processing that does not accurately reflect the ejection characteristics may be accidentally set in a certain processing unit. Then, at the time of actual printing, the HS processing is performed with the correction parameter, thereby causing density unevenness on the print image.

FIG. 5C illustrates an example in which the dither matrix illustrated in FIG. 5B is applied to a nozzle group in a larger area. Nozzles 10201 to 10212 of a print head 102 are arrayed at an interval corresponding to 1200 dpi. In FIG. 5C, the dither matrixes 410, each consisting of four pixels multiplied by four pixels of 1200 dpi illustrated in FIG. 5B, are continuously applied. Here, the threshold groups 4101 to 4104 represent columns on the dither matrix 410.

The threshold groups 4101 correspond to areas to be printed by the nozzles 10201, 10205, and 10209, respectively;

the threshold groups 4102 correspond to areas to be printed by the nozzles 10202, 10206, and 10210 respectively;

the threshold groups 4103 correspond to areas to be printed by the nozzles 10203, 10207, and 10211 respectively; and the threshold groups 4104 correspond to areas to be printed by the nozzles 10204, 10208, and 10212 respectively.

In the same manner as FIG. 5B, FIG. 5C illustrates the result of quantization of image data in which all of the pixels have a pixel value "6." As is obvious from FIG. 5C, it is understood that even if all of the nozzles 10201 to 10212 eject the ink in the same amount, the number of dots is varied according to each of the nozzles. Consequently, it is determined that the nozzles 10202, 10204, 10206, 10208, 10210 and 10212 corresponding to the threshold groups 4102 and 4104 eject the ink in amount smaller than that by the other nozzles. And then, a correction parameter that does not accurately reflect the ejection characteristics is accidentally set, and thus, a printed image unfavorably may have an uneven density at the time of actual printing.

As for the degree of the density unevenness, a difference of one gradation is equivalent to a lightness L of 6.25 in the case where a lightness L ranging from 0 to 100 is to be reproduced in, for example, 17 gradations. Alternatively, a difference of one gradation is equivalent to a lightness L of about 0.4 in the case of 256 gradations. A color difference of 6.25 (which is almost equal to a difference in lightness L of about 6.25) that is a difference of one gradation out of the 17 gradations signifies a B-grade tolerance according to the JIS. The difference is such a level that the color difference can be recognized by visual comparison. Alternatively, a color difference of 0.8 (which is almost equal to a difference in lightness L of about 0.8) that is a difference of two gradations out of the 256 gradations signifies an AA-grade tolerance. The difference is such a level that the density difference can be recognized by adjacently visual comparison.

In order to suppress the occurrence of the density unevenness caused by the HS processing described above with reference to FIGS. 5A to 5C, it is conceived that the thresholds are assigned on the dither matrix such that the same number of dots can be generated per processing unit with respect to the image data having the same gradation, as described above. There is an example in which all of the thresholds in the threshold groups 4001 and 4004 illustrated in FIGS. 5A and 5B have the threshold group consisting of the same thresholds. Specifically, not the dither matrix consisting of four pixels multiplied by four pixels but a dither matrix consisting of one pixel multiplied by 16 pixels is used in a processing unit of one pixel. When such a dither matrix is used for representing a general 8-bit image of 256 gradations, a dither matrix of one pixel multiplied by 255 pixels is required. In this case, when the dither matrix is used for image data of 600 dpi, the size of 255 pixels becomes 0.425 inch (i.e., about 10.9 mm). The more the number of gradations, the larger the size of the dither matrix. When a dither matrix larger in a direction perpendicular to the nozzle array direction is designed, there arises a problem that it becomes difficult to assign desired thresholds to desirable positions so as to achieve a given quality of an image. Besides the spiral and Bayer type dither matrixes illustrated in FIGS. 5A and 5B, respectively, a blue-noise mask, for example, has been known. This mask has a much larger dither matrix. Also in the case of this dither matrix, when a dither matrix larger in a direction perpendicular to the nozzle array direction is created in the same manner as the above-described example, a combination of thresholds is restricted and then the dither matrix is poor in a quality of an image, in particular, decreased granularity.

Next, a description will be given of the first embodiment of the present invention in order to suppress the above-described occurrence of the density unevenness caused by the HS processing.

Figure 6B:
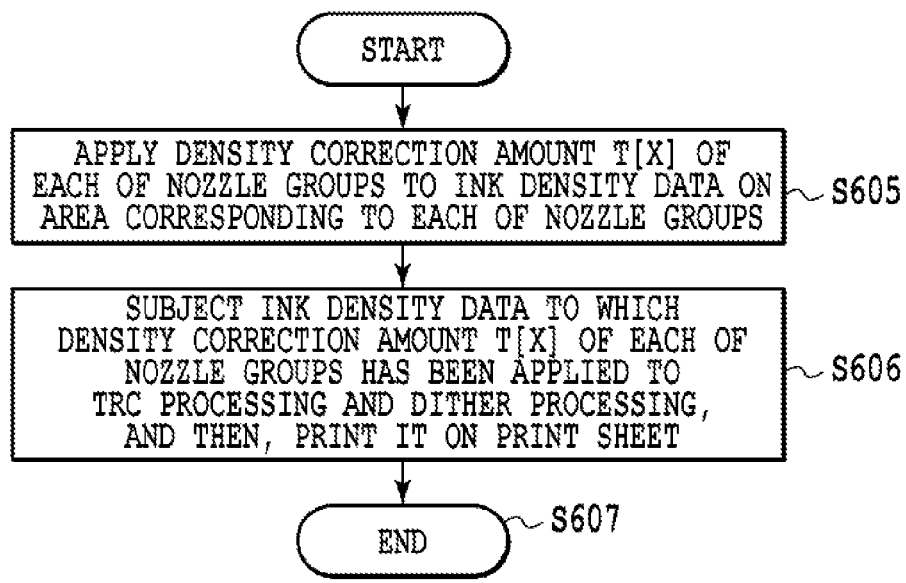

FIGS. 6A and 6B are flowcharts explanatory of processing for generating parameters of a table to be used in the HS processing part 506 illustrated in FIG. 4A and image processing with parameters generated during an actual printing operation, according to the first embodiment of the present invention, respectively.

FIG. 6A illustrates steps executed by the CPU 311 in order to generate parameters of a conversion table as a one-dimensional look-up table to be used in the HS processing part 506 in the present embodiment. In the present embodiment, this parameter generation is forcibly or selectively performed when a printer is fabricated, a printer is used for a predetermined period of time, or a printer performs a printing operation by predetermined amount. Alternatively, the parameter generation may be performed before every printing operation, for example. In other words, this processing can be performed as so-called calibration, thereby updating table parameters contained in a conversion table. Regarding, for example, a nozzle group (i.e., a processing unit) whose ejection amount is measured to be more than normal amount and whose patch density is measured to be higher, the pixel value of image data corresponding to the nozzle group is corrected to become smaller based on the table parameters in the HS processing part, thereby reducing the number of dots to be printed by the nozzle group. In contrast, regarding a nozzle group whose patch density is measured to be lower, the pixel value of image data corresponding to the nozzle group is corrected to become greater.

Upon the start of the table parameter generation used in the HS processing part 506 illustrated in FIG. 6A, first in step S602, the ink is ejected from all of the nozzles of each of the print heads shown in FIG. 1 so as to print a measuring image (i.e., a patch) on a print medium. In this case, a measuring image (i.e., a patch) having a specified one out of signal values 0 to 255 with respect to each of pieces of data C, M, Y, and K is printed.

In printing a patch, measuring image data 510 consisting of ink color signals is used, as illustrated in FIG. 4A, unlike a normal printing operation. Specifically, the measuring image data 510 is input directly into the TRC processing part 507 not through the processing in each of the input color converting part 503, the ink color converting part 505, and the HS processing part 506. This route is indicated by a broken line 511 as a bypass route in FIG. 4A. Then, the measuring image data corrected in the TRC processing part 507 is subjected to quantization in the dither processing part 508, and then, is sent to the output part 509. Thus, the output part 509 prints a measuring image on the print medium 106.

The size of a dither matrix used in the quantization in the dither processing part 508 builds the relationship of an integral multiple with respect to a processing unit width (i.e., the number of pixels) in the HS processing part, as described later with reference to FIGS. 7A and 7B. Therefore, the measuring image that has generated through the dither processing and finally printed can relatively favorably reflect the ejection characteristics of the nozzle group. Consequently, it is possible to avoid the occurrence of the density unevenness caused by the HS processing.

Incidentally, although the image data (C, M, Y, and K) consisting of the ink color signals have been used as the measuring image in the above-described explanation, RGB data may be used, to be subjected to the processing from the input color converting part 503 to the HS processing part 506. In this case, an input is equal to an output in a processing table in the input color converting part 503 or the HS processing part 506. It is preferable that a processing table that is not substantially processed should be set. To the contrary, data dedicated for measurement after the TRC processing may be prepared, so that the dither processing part 508 may first perform processing.

Subsequently in step S603, the scanner 107 measures the measuring image printed on the print medium in step S602, thereby obtaining nozzle group print density information B[X] per area [X] based on the measurement result. Here, the area [X] expresses information that indicates, in two nozzles, the positions of the nozzles for each of the colors in the x direction in each of the print heads 101 to 104 shown in FIG. 1. In other words, the HS processing part 506 in the present embodiment performs the HS processing in each nozzle group consisting of two nozzles out of a plurality of nozzles (hereinafter referred to as a "processing unit"). More specifically, the HS processing part 506 corrects, in the same manner, each of the image data on the two pixels having a resolution of 1200 dpi with a parameter set per area [X] having a resolution of 600 dpi indicating the processing unit.

A detailed method for acquiring the nozzle group print density information B[X] is as follows: the scanner 107 reads the print density of an area in a patch which is printed by the two nozzles corresponding to the area [X] of each of the ink colors, and then, the 8-bit RGB read data is subjected to the following calculations:

$C = 255 - R;$ $M = 255 - G;$ $Y = 255 - B;$ and $K = 255 - G,$ thus obtaining the nozzle group print density information B[X]. Examples of a method for converting the data read by the scanner 107 into print density information may include a known technique such as a method of using a one- or three-dimensional look-up table, in addition to using the difference obtained by subtracting the read value from 255.

Here in the present embodiment, the resolution by the scanner, that is, the arrangement pitch of reading elements arranged in the scanner should not be particularly limited. For example, the resolution by the scanner may be higher than a print resolution of 1200 dpi by the print head. Moreover, the scanner 107 need not always be the same full-line type as the print heads, as shown in FIG. 1. The scanner 107 may be of a serial type for performing colorimetry in a predetermined period of time while moving in the x direction in FIG. 1. Alternatively, the scanner 107 may be prepared separately from the printer. In this case, a signal connection may be made between a scanner and a printer, thereby enabling a measurement result to be automatically input into the printer from the scanner. Additionally, the nozzle group print density information B[X] need not always represent the CMYK density obtained by calculation based on the RGB information. For example, the nozzle group print density information B[X] may have any formats such as L*a*b* measured by a colorimeter. As long as the nozzle group print density information B[X] in the area X corresponding to two nozzles by various kinds of processing such as averaging can be properly obtained, the color may be measured at any resolutions in any formats.

Next in step S604, density correction amount T[X] for the area [X] is calculated based on a standard print density A and the nozzle group print density information B[X] obtained in step S603. Here, the standard print density A signifies a target value of the print density information obtained by printing and measuring a patch in the printer of the present embodiment based on the measuring image data (C, M, Y, and K). Specifically, the target value may be obtained as a result of a process that the scanner 107 measures an image printed by using nozzles for ejecting ink in standard ejection amount, and then, converts the measurement result into print density information.

Specifically, the density correction amount T[X] can be expressed by the following equation.

$$\text{Density correction amount } T[X] = A - B[X]$$

Actually, the value A−B[X] indicating the difference in density on a sheet may not accord with correction amount of ink color density data in the HS processing part 506. In such a case, it is desirable to calculate the density correction amount T[X] based on the difference A−B[X] in density on a sheet according to predetermined conversion. The conversion may be achieved by appropriately using known techniques such as statistically approximate/density estimation and density search. Explanation will be made below on the present embodiment assuming that the density correction amount T[X] is equal to A−B[X].

The density correction amount T[X] is obtained in the above-described manner and is stored in a memory serving as a storing part for each area [X]. The above-described series of processing for generating the density correction amount T[X] is repeated times required for the respective gradation values of C, M, Y, and K, thus creating the density correction amount T[X] of the respective gradation values of C, M, Y, and K.

Incidentally, the above-described series of processing for generating the density correction amount T[X] may not be performed with respect to all of gradations of 0 to 255, but correction values of other gradations may be estimated with reference to generated correction values of gradations. As the density correction amount T[X], the density correction amount may be stored as it is, or an amount corrected by using the density correction amount may be stored. In the case of storing the correction amount, there are advantages that a correction degree is readily modulated or finely adjusted. In contrast, in the case of storing the corrected amount, the calculated value is stored, thereby bringing an advantage of quick processing. Although the value is stored in the HDD 303 in the host PC at this time in the present embodiment, it may be stored in a non-volatile memory provided in the printer. At any rate, the created table parameter should be preferably treated in such a manner as not to be lost at a timing when a power source is turned off, for example.

Next, explanation will be made on processing to be performed by the HS processing part 506 during printing with reference to FIG. 6B. This processing is a part of the processing to be performed by the image processing accelerator 316 as the series of image processing part illustrated in FIG. 4A during the normal printing operation, and is equivalent to the processing performed by the HS processing part 506 illustrated in FIG. 4A.

First, the image processing accelerator 316 corrects, in step S605, the image data on the ink colors, which has been subjected to the processing in the input color converting part 503 and the input color converting part 505, by using the table parameter created by the processing described with reference to FIG. 6A, that is, the density correction amount T[X].

Here, it is determined where in the above-described areas [X] an object pixel that is subjected to the image processing is contained. That is, a value X is determined. Here, since each of the areas [X] corresponds to an area of two nozzles of 600 dpi whereas the resolution of a pixel in the image processing is 1200 dpi, the two pixels in the x direction correspond to each of the areas [X].

When the value X of the area [X] containing an object pixel k is obtained as X=n, a density correction amount T[n] created in a manner corresponding to the area [n] is acquired from the table. And then, a density value [k] indicated by image data (C, M, Y, and K) on the object pixel k is corrected with the density correction amount T[n], as follows:

Corrected density value[$k$]=density value[$k$]+density correction amount $T[n]$ Subsequently in step S606, the image processing accelerator 316 subjects the ink density data whose density value is corrected in step S605 to processing by the TRC processing part 507 and the quantizing part 508 that uses the dither matrix described later with reference to FIGS. 7A and 7B. Thereafter, the output part 509 prints dots on the print medium 106 based on the resultant binary data.

Figure 7A:
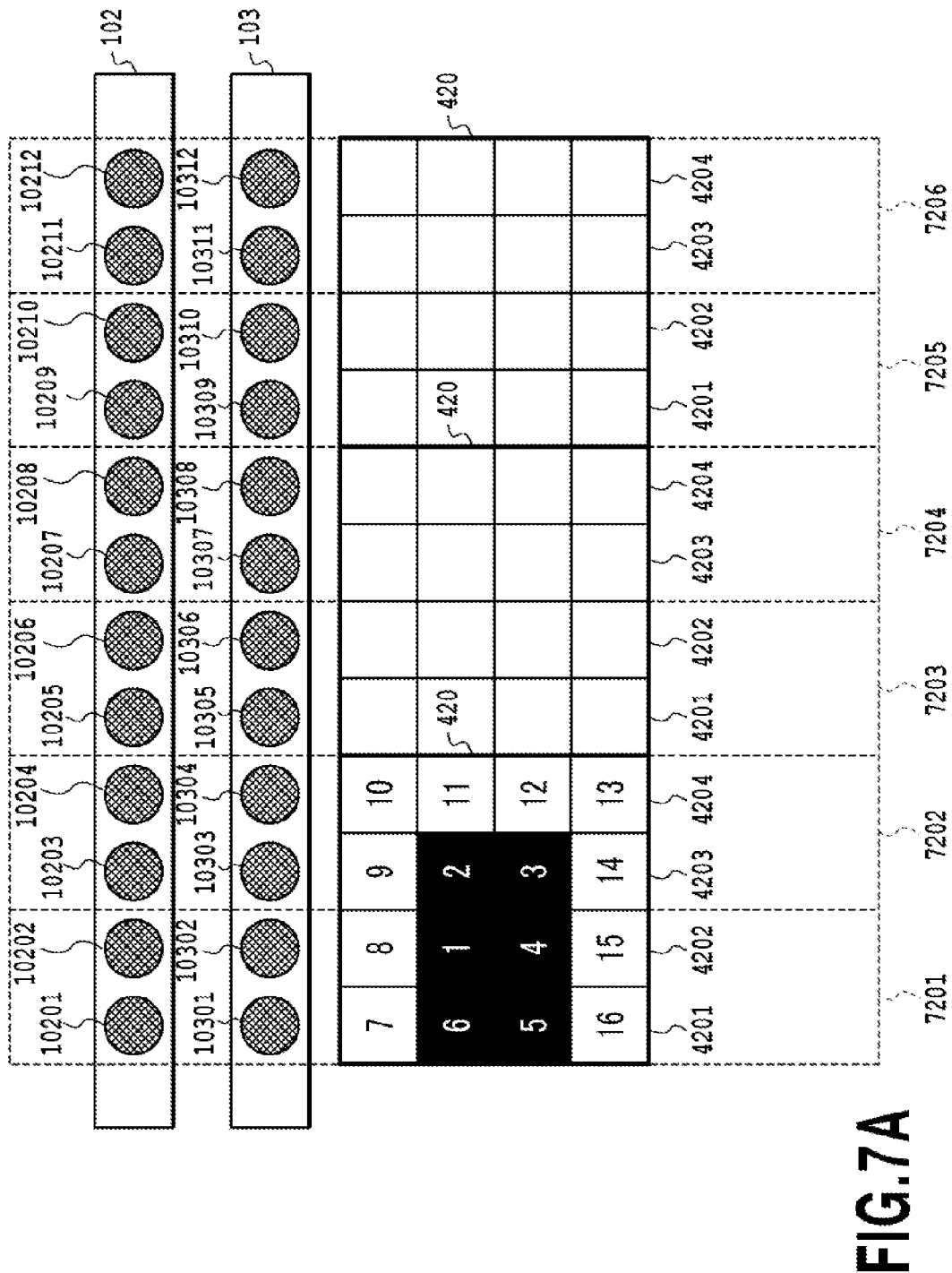
FIGS. 7A and 7B are diagrams explanatory of the relationship between a processing unit and the size of a dither matrix in the parameter generation for the HS and the HS according to the first embodiment, respectively.
Figure 7B:
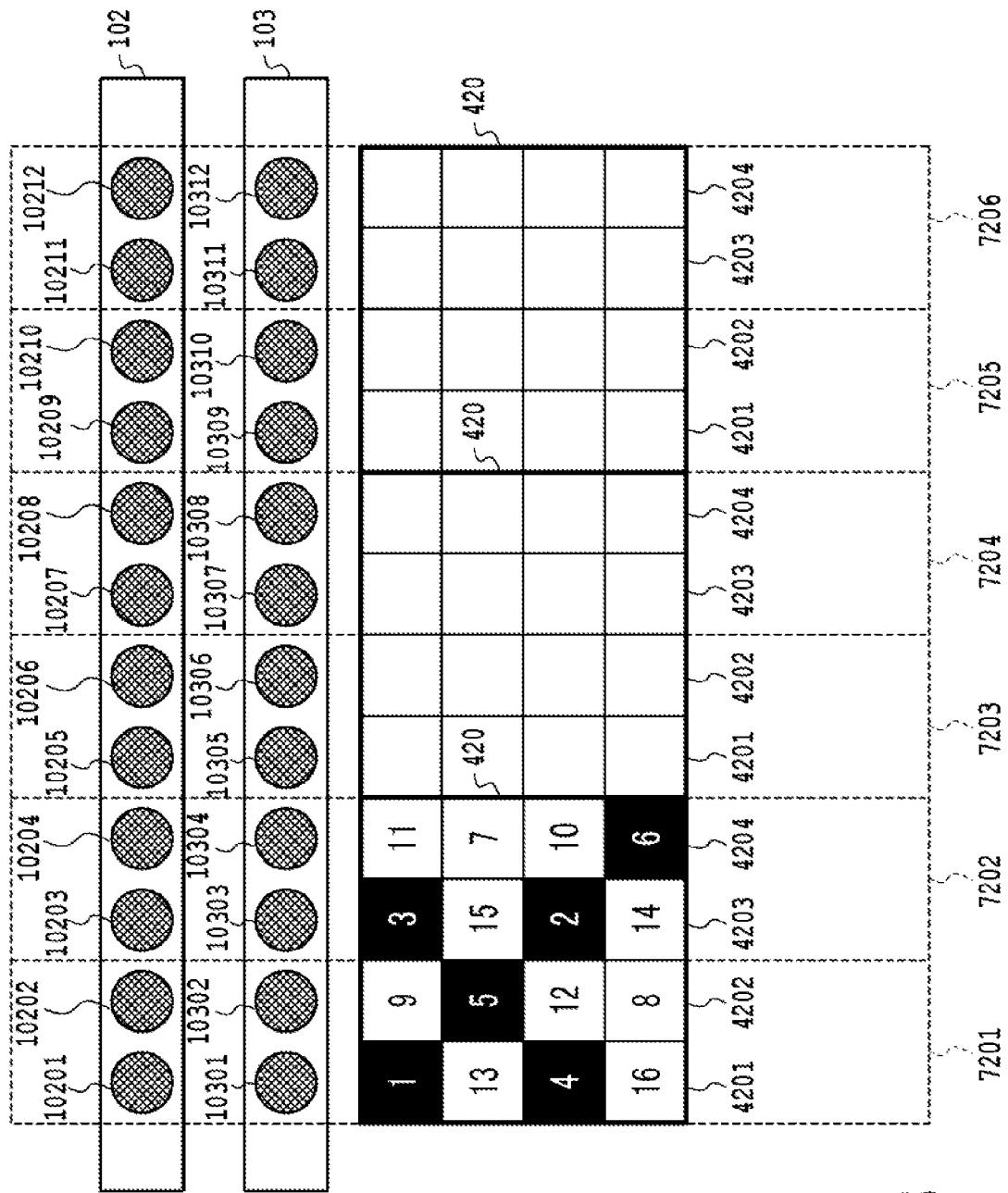

FIGS. 7A and 7B are diagrams explanatory of a relationship between the processing unit and the size of the dither matrix in each of the parameter generation processing for the HS processing and the HS processing, described with reference to FIGS. 6A and 6B according to the first embodiment. FIG. 7A illustrates a case of the binarization of the pixel value "6" with the spiral dither matrix illustrated in FIG. 5A; and further, FIG. 7B illustrates a case of the binarization of the pixel value "6" with the Bayer type dither matrix illustrated in FIG. 5B.

Rectangles 7201 to 7206 indicated by broken lines in FIGS. 7A and 7B show areas of dither matrixes corresponding to the processing units in the HS processing. As illustrated in FIGS. 7A and 7B, the processing unit consists of two pixels corresponding to a nozzle group consisting of two nozzles (i.e., a printing element group) obtained by dividing a plurality of nozzles in a nozzle array. In the meantime, a dither matrix 420 has a size of four pixels multiplied by four pixels of 1200 dpi and is repeatedly used. Threshold groups 4201 to 4204 as groups of thresholds on the dither matrix 420 in a direction perpendicular to a nozzle array direction correspond to nozzles of the cyan head 102, as follows:

Threshold group 4201: nozzles 10201, 10205, and 10209
Threshold group 4202: nozzles 10202, 10206, and 10210
Threshold group 4203: nozzles 10203, 10207, and 10211
Threshold group 4204: nozzles 10204, 10208, and 10212

The number of pixels as the processing unit in the HS and the size of the dither matrix have the relationship, as follows: the size of the dither matrix (i.e., four pixels) is twice the number of pixels (i.e., the two pixels). By the above relationship, in the case of, for example, the spiral dither matrix illustrated in FIG. 7A, four dots (i.e., binary data) are generated in the processing unit 7201, and further, two dots are generated in the processing unit 7202. In the meantime, in the case of the Bayer type dither matrix illustrated in FIG. 7B, three dots are generated in the processing unit 7201, and further, three dots are generated also in the processing unit 7202.

In this manner, as viewed from each of the processing units, an increase in width of the processing unit by one pixel can maintain a threshold arrangement corresponding to a quality of an image targeted by a dither matrix while increasing the possibility of preventing zero dots from being generated, unlike the case illustrated in FIG. 5A. In the same manner, the increase in the width can maintain the threshold arrangement while increasing the possibility of generating the same number of dots in each of the processing units. As a consequence, the print characteristics of the nozzles or the like per processing unit can be favorably reflected on the patch to be printed, so that it is possible to reduce the occurrence of the density unevenness of the print image even if the HS processing is performed with the parameter of the HS processing finally obtained based on the patch.

As described above, it is possible to reduce the occurrence of the density unevenness caused by the HS processing while maintaining the threshold arrangement corresponding to a predetermined quality of an image targeted by a dither matrix, so that the limitation to the threshold arrangement caused by the HS processing can be overcome according to the degree of the reduction. In other words, it is possible to relatively reduce the limitation to the threshold arrangement on the dither matrix by the HS processing.

When expressing generalized terms of the relationship of the number of pixels as the processing unit (processing unit width) in the HS processing to the size of the dither matrix, the size of the dither matrix is an integral multiple of the processing unit width.

As one indication of the reduction of the limitation to the threshold arrangement, an indication that the numbers of dots generated in the respective processing units become the same as each other is used. The indication shows a white circle "○" representing the case where the number of dots becomes the same, and shows a cross "x" representing the case where the number of dots does not become the same, in each of cases where the processing unit width (i.e., the number of pixels) is one pixel, two pixels, and four pixels, as follows:

TABLE 1

| | HS processing unit width | | |
|---|---|---|---|
| limitation to threshold arrangement | 1 pixel | 2 pixels | 4 pixels |
| 1 pixel × 256 pixels | ○ | ○ | ○ |
| 2 pixels × 128 pixels | x | ○ | ○ |
| 4 pixels × 64 pixels | x | x | ○ |

As is obvious from Table 1, as the processing unit width in the HS becomes greater, the limitation to the threshold arrangement is more reduced.

Figure 8:
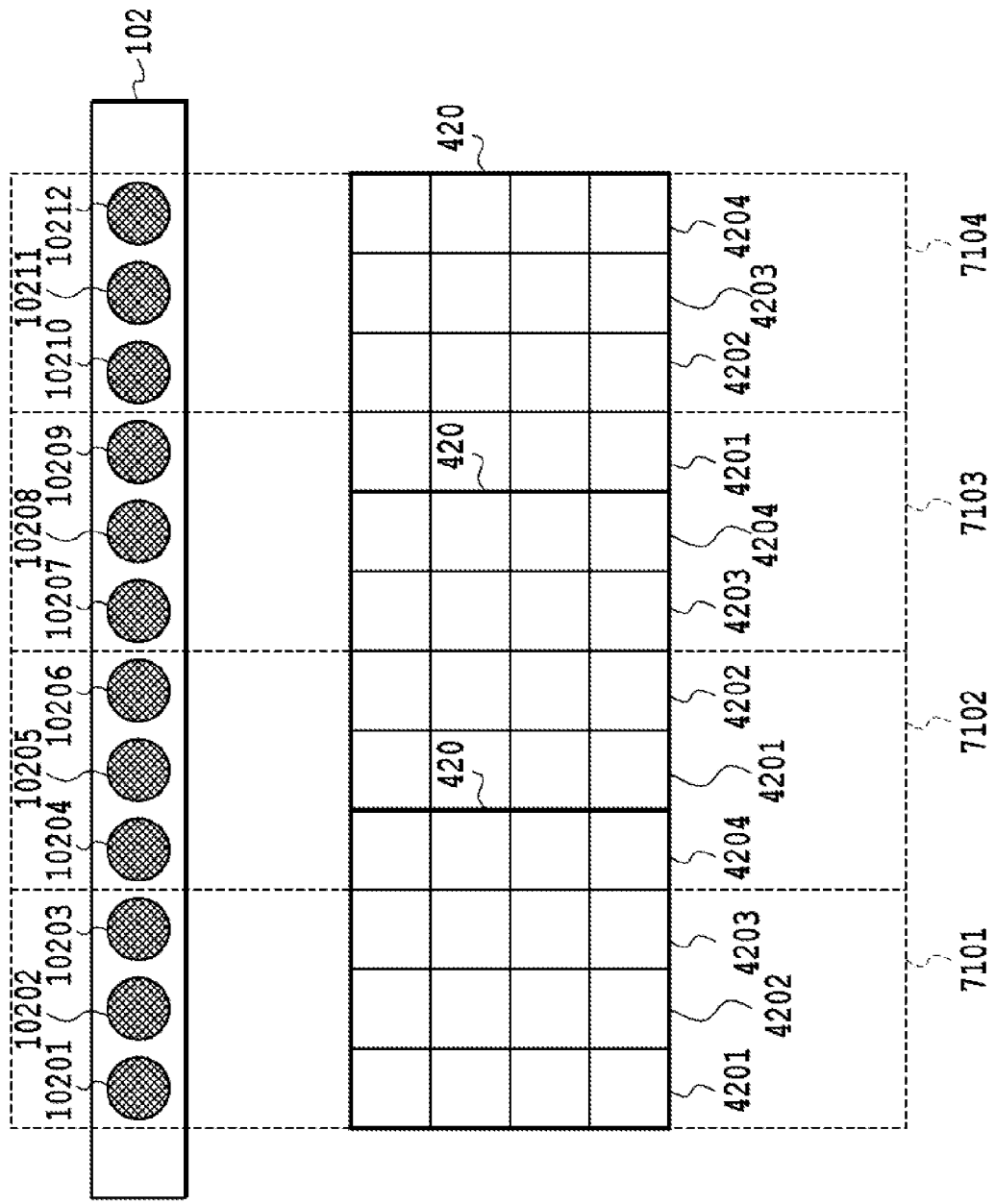
FIG. 8 is a diagram explanatory of an example in which a processing unit width and the size of a dither matrix in the HS satisfy a coprime relationship.

FIG. 8 is a diagram explanatory of an example in which the processing unit width in the HS processing and the size of the dither matrix do not build the relationship of the integral multiple.

Referring to FIG. 8, a print head 102, nozzles 10201 to 10212, a dither matrix 420, and threshold groups 4201 to 4204 are the same as those illustrated in FIGS. 7A and 7B. Rectangles 7101 to 7104 indicated by broken lines in FIG. 8 are areas corresponding to the processing unit in the HS processing. In an example illustrated in FIG. 8, Processing unit width=3 pixels Specifically, the size of a dither matrix (4 pixels) and the processing unit width (3 pixels) in an x direction (i.e., a nozzle array direction) satisfy a coprime relationship to each other. In this case, the threshold groups for each area corresponding to each of the processing units are defined, as follows:

First combined threshold group (processing unit area 7101): threshold group 4201, threshold group 4202, and threshold group 4203

Second combined threshold group (processing unit area 7102): threshold group 4204, threshold group 4201, and threshold group 4202

Third combined threshold group (processing unit area 7103): threshold group 4203, threshold group 4204, and threshold group 4201

Fourth combined threshold group (processing unit area 7104): threshold group 4202, threshold group 4203, and threshold group 4204

Suppose that it is designed to combine thresholds so as to generate the same number of dots with respect to, for example, an input pixel value "6" in each of the combined threshold groups.

Here, the set of thresholds in which the first combined threshold group and the second combined threshold group have the threshold set that generates the same number of dots is expressed by the following equation:

First combined threshold group=second combined threshold

Under this condition, the first combined threshold group consists of the threshold group 4201, the threshold group 4202, and the threshold group 4203 whereas the second combined threshold group consists of the threshold group 4204, the threshold group 4201, and the threshold group 4202, thereby leading to the relationship that the threshold group 4203=the threshold group 4204. In the same manner, from the relationship that the second combined threshold group=the third combined threshold group the second combined threshold group consists of the threshold group 4204, the threshold group 4201, and the threshold group 4202 whereas the third combined threshold group consists of the threshold group 4203, the threshold group 4204, and the threshold group 4201, thereby leading to the relationship that the threshold group 4202=the threshold group 4203.

Moreover, from the relationship that the third combined threshold group=the fourth combined threshold group, the third combined threshold group consists of the threshold group 4203, the threshold group 4204, and the threshold group 4201 whereas the fourth combined threshold group consists of the threshold group 4202, the threshold group 4203, and the threshold group 4204, thereby leading to the relationship that the threshold group 4201=the threshold group 4202. In the end, the following relationship can be led:

the threshold group 4201=the threshold group 4202=the threshold group 4203=the threshold group 4204

In summary, the threshold groups 4201, 4202, 4204, and 4204 on the dither matrix 420 need have the set of thresholds that can generate the same number of dots, thereby limiting the set of the threshold arrangements. In other words, in the case where the size of the dither matrix (i.e., 4 pixels) and the processing unit width (i.e., 3 pixels) in the HS processing build the coprime relationship, it is impossible to reduce the limitation to the set of the thresholds even if the processing unit width is greater than one. This means that the characteristics of the threshold arrangement with respect to a quality of an image inherently targeted by the dither matrix cannot be maintained.

In the same manner as described above, when an indication that the numbers of dots generated in the respective processing units become the same as each other is used, the indication shows a white circle "○" representing the case where the number of dots becomes the same, and shows a cross "x" representing the case where the number of dots does not become the same, in each of cases where the processing unit width (i.e., the number of pixels) is one pixel, two pixels, three pixels and four pixels, as follows:

TABLE 2

| | HS processing unit width | | | |
|---|---|---|---|---|
| limitation to threshold arrangement | 1 pixel | 2 pixels | 3 pixels | 4 pixels |
| 1 pixel × 256 pixels | ○ | ○ | ○ | ○ |
| 2 pixels × 128 pixels | x | ○ | x | ○ |
| 4 pixels × 64 pixels | x | x | x | ○ |

As is found from the above, according to the present embodiment, the relationship between the size of the dither matrix and the HS processing unit width is represented by the numbers of pixels that are not coprime and are 2 or more. As a consequence, it is possible to relatively reduce the limitation to the threshold arrangement on the dither matrix so as to achieve a given target quality of an image in the case of the quantization with the dither matrix in a system for performing the HS processing. That is to say, the characteristics of the threshold arrangement on the dither matrix can be maintained to achieve the target quality of an image, and further, the number of dots obtained by the quantization with the dither matrix can be determined in such a manner as not to generate a large difference between the processing units.

Second Embodiment

A second embodiment of the present invention relates to a configuration that relatively reduces a limitation to threshold arrangement on a dither matrix for achieving a given target quality of an image, in the case where a system for performing so-called color shading performs quantization with a dither matrix.

When multiple colors (mixed colors) are reproduced by superimposing two or more kinds of inks in mixture, so-called a color shift may occur. The color shift is a phenomenon in which a color in an area printed by nozzles for ejecting ink in different ejection amount from normal amount is different from an intended color to be printed. When, for example, a blue image is printed by nozzles for ejecting cyan ink in a normal ejection amount and magenta ink in ejection amount larger than the normal ejection amount, a dot formed on a print medium with the magenta ink ejected in the ejection amount larger than the normal amount is greater than that formed with the cyan ink. In this way, a difference in a color, that is, a color shift occurs in areas corresponding to the nozzles according to variations of the ejection characteristics of the nozzles. The color shading processing can cope with the above-described problem, thus eliminating the color shift.

FIG. 4B is a block diagram illustrating the feature of image processing to be performed by an ink jet printer according to a second embodiment of the present invention. The explanation on the same constituent elements as those described with reference to FIG. 4A will be omitted below.

Referring to FIG. 4B, an MCS (abbreviating Multi Color Shading) processing part 504 subjects image data converted by an input color converting part 503 to conversion so as to correct a difference in shade. The MCS processing part 504 corrects the image data for each processing unit described above in the first embodiment by using a conversion table (i.e., a correction table) consisting of a three-dimensional look-up table. This correction can reduce a difference in color that could not be corrected by the conventional HS. More specifically, it is possible to reduce a difference in color caused by variations in the ejection characteristics of nozzles in a print head in an output part 509.

Figure 9A:
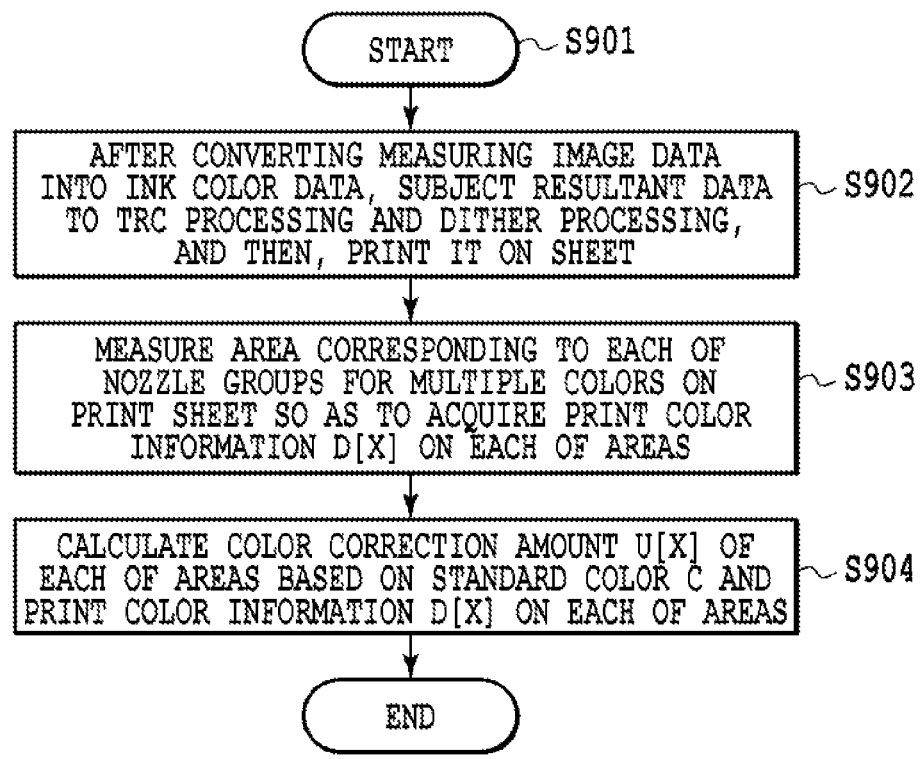
FIGS. 9A and 9B are flowcharts explanatory of processing for generating parameters of a table to be used in an MCS processing part 504 illustrated in FIG. 4B and image processing with the parameters, respectively.
Figure 9B:
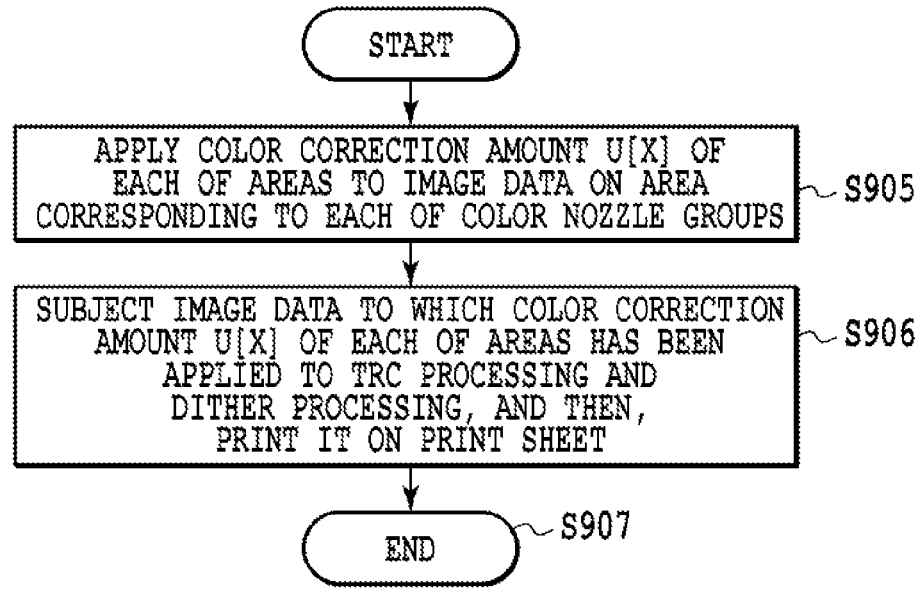

FIGS. 9A and 9B are flowcharts explanatory of processing for generating parameters of a table used in the MCS processing part 504 illustrated in FIG. 4B and image processing with use of the parameters, respectively, and are similar to FIGS. 6A and 6B, respectively.

First, a description will be given of processing for generating the table parameter with reference to FIG. 9A. Upon start of generating the table parameter for the MCS processing part 504, all of nozzles of each of print heads shown in FIG. 1 first eject ink so as to print a measuring image (i.e., a patch) on a print medium in step S902. In this case, a measuring image (i.e., a patch) of a specified signal value (0 to 255) with respect to each of R, G, and B is printed. In printing the patch, measuring image data 520 (see FIG. 4B) consisting of ink color signals is used, unlike a normal printing operation. As illustrated in FIG. 4B, the measuring image data 520 is input into an ink input color converting part 505 not through the input color converting part 503 and the MCS processing part 504. The measuring image data which has been converted into data indicating ink colors by the ink input color converting part 505, is converted into image data corresponding to the number of dots to be printed in a unit area through an HS processing part 506 and a TRC processing part 507, followed by quantization in a dither processing part 508, and thus, the resultant binary print data is sent to the output part 509. Thereafter, the output part 509 prints the measuring image on a print medium 106.

Next in step S903, the measuring image that has been printed on the print medium 106 in step S902 is measured by a scanner 107, and then, area print color information D[X] corresponding to an area [X] is acquired. Here, X is similar to that in the first embodiment. The MCS processing part 504 in the present embodiment makes color shading correction per area with respect to the image data corresponding to each of areas, each of which includes two nozzles out of a plurality of nozzles.

In step S904, color correction amount U[X] of the area [X] is calculated based on a standard color C and the area print color information D[X] acquired in step S903. The color correction amount U[X] is expressed as follows:

Color correction amount $U[X]=C-D[X]$.

Actually, C−D[X] as a difference in color on a sheet may not be equal to color data correction amount obtained by the MCS processing part 504. In such a case, the color correction amount U[X] is calculated based on the difference C−D[X] in color on a sheet by predetermined conversion. The conversion may be achieved by appropriately using already-known techniques such as statistically approximate/density estimation and density search, and therefore, the present embodiment is explained on the ideal assumption that the color correction amount U[X] is equal to C−D[X].

As described above, the color correction amount U[X] for the measuring image data 520 is obtained, and then, is stored in a memory as a storing part. The above-described series of processing for generating the color correction amount U[X] is repeated times required for the number of combinations of R, G, and B. Hence, the color correction amount U[X] is generated with respect to each of the combinations of R, G, and B. Incidentally, the above-described series of processing for generating the color correction amount U[X] may not be performed with respect to all of the combinations, and therefore, a correction value of one combination may be appropriately estimated with reference to a correction value of another combination.

Next, explanation will be made on processing steps to be performed by the MCS processing part 504, as illustrated in FIG. 9B. This processing is apart of processings performed by an image processing accelerator 316 in accordance with the series of image processing illustrated in FIG. 4B during the normal printing operation. This processing is equivalent to the processing performed by the MCS processing part 504 illustrated in FIG. 4B.

First, the image processing accelerator 316 subjects, in step S905, the image data processed in the input color converting part 503 to conversion with use of the table parameter created with reference to FIG. 9A, that is, the color correction amount U[X].

Color corrected data=input color data+color correction amount $U[X]$

Subsequently in step S906, the image processing accelerator 316 subjects the color data corrected in step S905 to processing by the ink color converting part 505, the HS processing part 506, the TRC processing part 507, and the quantizing part 508. Thereafter, the output part 509 prints dots on the print medium 106 in accordance with the resultant binary data. In this manner, an image whose color shift has been corrected is output.

Figure 10:
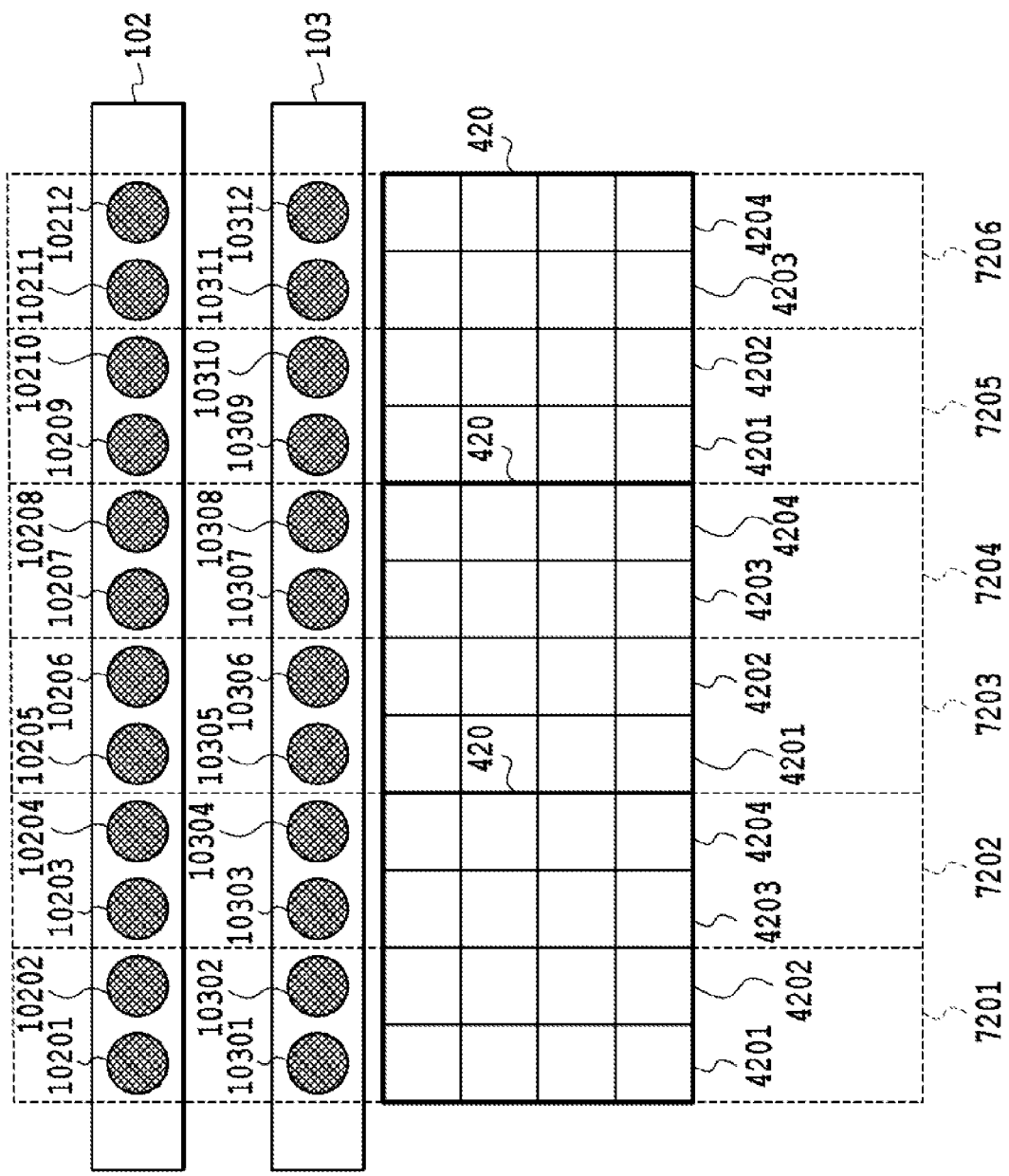
FIG. 10 is a diagram explanatory of an example in which a processing unit width and the size of a dither matrix in MCS satisfy a preferred relationship according to the second embodiment of the present invention.

FIG. 10 is a diagram explanatory of an example of a preferred relationship between a processing unit width in MCS processing and the size of a dither matrix, according to the second embodiment of the present invention. Constituent elements similar to those illustrated in FIGS. 7A and 7B are designated by the same reference numerals in FIG. 10, and therefore, their explanation will be omitted below.

The relationship between threshold groups on a dither matrix 420 and nozzles is as follows:

Threshold group 4201: nozzles 10201, 10205, 10209, 10301, 10305, and 10309

Threshold group 4202: nozzles 10202, 10206, 10210, 10302, 10306, and 10310

Threshold group 4203: nozzles 10203, 10207, 10211, 10303, 10307, and 10311

Threshold group 4204: nozzles 10204, 10208, 10212, 10304, 10308, and 10312

Rectangles 7201 to 7206 indicated by broken lines in FIG. 10 are areas corresponding to the processing units in the MCS processing. As illustrated in FIG. 10, an equation below is satisfied in the present embodiment.

One processing unit width for the MCS processing=2 pixels

Specifically, the relationship expressed by an equation below is established in an x direction (i.e., a nozzle array direction).

Size of dither matrix(4 pixels)=2×processing unit width(2 pixels)

In this case, combined threshold groups are as follows:

First combined threshold group: threshold group 4201 and threshold group 4202

Second combined threshold group: threshold group 4203 and threshold group 4204

Here, there is a high possibility that the number of dots formed becomes the same with respect to a predetermined input pixel value between the combined threshold groups. In this manner, it is possible to reduce occurrence of an uneven density caused by the MCS.

In the same manner as the first embodiment, when the size of the dither matrix and the processing unit width in the MCS processing satisfy a coprime relationship, it is impossible to reduce the limitation to the combinations of thresholds even if the processing unit width is greater than one.

In the same manner as described above, when an indication that the numbers of dots generated in the respective processing units become the same as each other is used, the indication shows a white circle "○" representing the case where the number of dots becomes the same, and shows a cross "x" representing the case where the number of dots does not become the same, in each of cases where the processing unit width (i.e., the number of pixels) is one pixel, two pixels, three pixels and four pixels, as follows:

TABLE 3

| | MCS processing unit width | | | |
|---|---|---|---|---|
| limitation to threshold arrangement | 1 pixel | 2 pixels | 3 pixels | 4 pixels |
| 1 pixel × 256 pixels | ○ | ○ | ○ | ○ |
| 2 pixels × 128 pixels | x | ○ | x | ○ |
| 4 pixels × 64 pixels | x | x | x | ○ |

As is found from the above description, the relationship between the size of the dither matrix and the processing unit width in the MCS processing is expressed by the number of pixels that are not coprime and are two or more, thereby relatively reducing the limitation to the threshold arrangement on the dither matrix. That is to say, the characteristics of the threshold arrangement on the dither matrix can be kept to achieve the target quality of an image, and further, the number of dots obtained by the quantization with the dither matrix can be determined so as not to generate a large difference between the processing units.

Other Embodiments

The description has been given of the embodiments in which the size of the dither matrix (i.e., the number of pixels) is 256 (4 in the description) and the number of pixels as the processing unit in the HS or the like is 2. The above description clarifies that the present invention is not limited to the above-described embodiments. In other words, the size of the dither matrix (i.e., the number of pixels) and the number of pixels as the processing unit should be a number satisfying the nth power of 2. Alternatively, the size of the dither matrix (i.e., the number of pixels) and the number of pixels as the processing unit may be the same as each other.

Moreover, although the description has been given of the embodiments in which the size of the dither matrix (i.e., the number of pixels) is the integral multiple of the processing unit width expressed by the number of pixels of 2 or more, the present invention is applicable to other embodiments. The present invention may be applied to a reverse relationship in which the processing unit width for the correction may be an integral multiple of the size of the dither matrix expressed by the number of pixels of 2 or more. Also in this case, it is obvious from the description of the embodiments that the same advantageous effects as those produced in the above-described embodiments can be produced. In summary, the present invention can be applied to embodiments in which either one of the number of pixels of the dither matrix and the number of pixels of the processing unit is the integral multiple of the other.

Moreover, although the dither matrix is used for binarization in the above-described embodiments, the present invention is not always limited to these embodiments. Image data of 256 values, for example, is quantized to data of 4 values, and then, the data may be binarized by using a dot arrangement pattern corresponding to each of levels indicated by the 4-value data. Additionally, although the above-described embodiments relate to a printing apparatus of an ink jet system, the present invention is not limited to these embodiments. For example, the present invention may relate to a printing apparatus of a system for forming dots by thermal transfer, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-252262, filed Nov. 16, 2012, which is hereby incorporated by reference herein in its entirety.

What is claimed is:

1. An image processing apparatus that generates print data for performing printing by using a printing element array in which a plurality of printing elements are arrayed, said apparatus comprising:

a correction unit configured to correct image data of a pixel that corresponds to a printing element of a printing element group, according to print characteristics of the printing element of the printing element group, the correcting of the image data being performed for each of processing units that respectively correspond to a plurality of print element groups, which are obtained by dividing the plurality of printing elements of the printing element array; and a quantizing unit configured to quantize the image data that has been corrected by said correction unit, by using a dither matrix, wherein the number of pixels of the dither matrix on which thresholds are set, in an array direction in which the printing elements are arrayed, and the number of pixels of the processing unit in the array direction, which correspond to the pixels of the print element group, are not coprime to each other and are two or more, respectively.

2. The image processing apparatus as claimed in claim 1, wherein one of the number of pixels of the dither matrix in the array direction and the number of pixels of the processing unit in the array direction is an integral multiple of the other.

3. The image processing apparatus as claimed in claim 1, wherein the number of pixels of the dither matrix in the array direction and the number of pixels of the processing unit in the array direction are numbers satisfying the nth power of 2, respectively.

4. The image processing apparatus as claimed in claim 1, wherein the number of pixels of the dither matrix in the array direction and the number of pixels of the processing unit in the array direction are the same as each other.

5. A printing apparatus that performs printing based on print data by using a printing element array in which a plurality of printing elements are arrayed, said apparatus comprising:
- a correction unit configured to correct image data of a pixel that corresponds to a printing element of a printing element group, according to print characteristics of the printing element of the printing element group, the correcting of the image data being performed for each of processing units that respectively correspond to a plurality of print element groups, which are obtained by dividing the plurality of printing elements of the printing element array; and
- a quantizing unit configured to quantize the image data that has been corrected by said correction unit, by using a dither matrix,
- wherein the number of pixels of the dither matrix on which thresholds are set, in an array direction in which the printing elements are arrayed, and the number of pixels of the processing unit in the array direction, which correspond to the pixels of the print element group, are not coprime to each other and are two or more, respectively.

6. An image processing method for generating print data used for performing printing by using a printing element array in which a plurality of printing elements are arrayed, said method comprising:
- a correction step of correcting image data of a pixel that corresponds to a printing element of a printing element group, according to print characteristics of the printing element of the printing element group, the correcting of the image data being performed for each of processing units that respectively correspond to a plurality of print element groups, which are obtained by dividing the plurality of printing elements of the printing element array; and
- a quantizing step of quantizing the image data that has been corrected in said correction step, by using a dither matrix,
- wherein the number of pixels of the dither matrix on which thresholds are set, in an array direction in which the printing elements are arrayed, and the number of pixels of the processing unit in the array direction, which correspond to the pixels of the print element group, are not coprime to each other and are two or more, respectively.

* * * * *